US012577113B2

(12) United States Patent
Sasayama et al.

(10) Patent No.: US 12,577,113 B2
(45) Date of Patent: Mar. 17, 2026

(54) METHOD FOR PRODUCING CARBON MONOXIDE AND APPARATUS USED THEREFOR

(71) Applicant: National Institute of Advanced Industrial Science and Technology, Tokyo (JP)

(72) Inventors: Tomone Sasayama, Tsukuba (JP); Fumihiko Kosaka, Tsukuba (JP); Koji Kuramoto, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 199 days.

(21) Appl. No.: 18/129,195

(22) Filed: Mar. 31, 2023

(65) Prior Publication Data

US 2023/0242406 A1     Aug. 3, 2023

Related U.S. Application Data

(63) Continuation-in-part of application No. PCT/JP2022/019516, filed on May 2, 2022.

(30) Foreign Application Priority Data

Sep. 8, 2021     (JP) ................................. 2021-146155

(51) Int. Cl.
| | |
|---|---|
| *C01B 32/40* | (2017.01) |
| *B01J 20/04* | (2006.01) |
| *B01J 23/04* | (2006.01) |

(52) U.S. Cl.
CPC .............. *C01B 32/40* (2017.08); *B01J 20/04* (2013.01); *B01J 23/04* (2013.01)

(58) Field of Classification Search
CPC combination set(s) only.
See application file for complete search history.

(56) References Cited

U.S. PATENT DOCUMENTS

2018/0015444 A1     1/2018  Porosoff et al.

FOREIGN PATENT DOCUMENTS

| | | |
|---|---|---|
| CN | 107376826  A | 11/2017 |
| JP | 2000-233917  A | 8/2000 |

(Continued)

OTHER PUBLICATIONS

Keturakis, C. J.; et al., Monitoring Solid Oxide CO2 Capture Sorbents in Action, ChemSusChem, 2014, 7, 3459-3466 (Year: 2014).*

(Continued)

*Primary Examiner* — Keling Zhang
(74) *Attorney, Agent, or Firm* — XSENSUS LLP

(57) ABSTRACT

A method for producing carbon monoxide, the method may comprise the steps of: (a) preparing an adsorption-conversion catalyst comprising a support, and an additive comprising at least one selected from the group consisting of an alkali metal and an alkaline earth metal, supported on the support, and not substantially comprising Ni, Fe, Co, Cr, Cu, Ru, In, Rh, Pt, Au, and Pd elements; (b) bringing the adsorption-conversion catalyst into contact with a gas containing carbon dioxide to allow the adsorption-conversion catalyst to capture carbon dioxide; and (c) bringing the adsorption-conversion catalyst to which carbon dioxide is captured into contact with a reducing gas to produce carbon monoxide.

14 Claims, 7 Drawing Sheets

(56)            References Cited

FOREIGN PATENT DOCUMENTS

| JP | 2012-025636 A | 2/2012 |
| JP | 2019-188353 A | 10/2019 |
| WO | 2008/038484 A1 | 4/2008 |

OTHER PUBLICATIONS

Li, S.; et al., Potassium-Promoted y-Alumina Adsorbent from K2CO3 Coagulated Amunia Sol for Warm Gas Carbon Dioxide Separation, ACS Sustainable Chem. Eng., 2015, 3, 111-116 (Year: 2015).*

Notice of Reasons for Refusal mailed May 7, 2024, in Japanese Application No. 2023-519798, 6 pages. (with translation).

Supplementary European Search Report mailed Nov. 19, 2024, in European Application No. 22866983.4, 10 pages.

Sun et al., "Understanding the interaction between active sites and sorbents during the integrated carbon capture and utilization process", Fuel, Elsevier, Sciencedirect, vol. 286, available online Oct. 10, 2020, total 9 pages.

Kosaka et al., "Enhanced Activity of Integrated CO2 Capture and Reduction to CH4 under Pressurized Conditions toward Atmospheric CO2 Utilization", ACS Sustainable Chemistry & Engineering, vol. 9, No. 9, Published on Feb. 25, 2021, pp. 3452-3463, total 12 pages.

International Search Report and Written Opinion mailed on Jun. 21, 2022, received for PCT Application PCT/JP2022/019516, filed on May 2, 2022, 10 pages including English Translation.

Bobadilla et al., "Enabling continuous capture and catalytic conversion of flue gas CO2 to syngas in one process", Journal of CO2 Utilization, vol. 14, 2016, pp. 106-111.

Hyakutake et al., "Unravelling the nature, evolution and spatial gradients of active species and active sites in the catalyst bed of unpromoted and K/Ba-promoted Cu/Al2O3 during CO2 capture-reduction", Journal of Materials Chemistry A, vol. 4, 2016, pp. 6878-6885.

Kondakindi et al., "Na2CO3-based sorbents coated on metal foil: CO2 capture performance", International Journal of Greenhouse Gas Control, vol. 15, 2013, pp. 65-69.

Peng et al., "Co—Fe Clusters Supported on N-Doped Graphitic Carbon as Highly Selective Catalysts for Reverse Water Gas Shift Reaction", ACS Sustainable Chemistry & Engineering, vol. 9, 2021, pp. 9264-9272.

Nanase et al., "Development of K-based carrier particles for Carbon dioxide utilization in Carbonate looping", Proceeding of SCEJ 85th Annual Meeting (2020), PA162. (Previously filed; submitting English translation only.).

Long Zhang et al., "Comparative Studies of Phosphate-Modified CeO2 and Al2O3 for Mechanistic Understanding of Dichloromethane Oxidation and Chloromethane Formation", ACS Catalysis, published on Oct. 28, 2020, vol. 10, No. 21,pp. 13109-13124, total 16 pages.

* cited by examiner

Carbon monoxide + Hydrogen or the like

Back pressure adjustment valve

Back pressure adjustment valve

CO2-free gas

Inert gas (such as N2)

Flow of particles

Carbon dioxide capture reactor

CO2-containing gas

Compressor

Inert gas (such as N2)

Carbon monoxide synthesis reactor

H2

Compressor

METHOD FOR PRODUCING CARBON MONOXIDE AND APPARATUS USED THEREFOR

CROSS REFERENCE TO RELATED APPLICATIONS

This application is a Continuation of PCT International Application No. PCT/JP2022/019516, filed on May 2, 2022, which is claiming priority of Japanese Patent Application No. 2021-146155, filed on Sep. 8, 2021, all of which are hereby expressly incorporated by reference in its entirety into the present application.

BACKGROUND OF THE DISCLOSURE

Field of the Disclosure

The present disclosure relates to a method for producing carbon monoxide (CO), and an apparatus therefor.

Background Art

In recent years, there have been actively studied procedures for converting $CO_2$ as a substance responsible for global warming, into fuels or chemical products for effective utilization. One of such procedures, a process using a dual-function material having both the capture function of $CO_2$ and the catalytic function has been attracted because the energy consumption is relatively low and even a low concentration of $CO_2$ can be efficiently captured and converted. However, most of examples reported until now have been aimed at conversion of $CO_2$ to methane. Methane is chemically stable, and requires a lot of energy for conversion into another substances and an enhancement in added value, and is thus considered to be mainly utilized for fuels.

Meanwhile, if $CO_2$ captured in dual-function material can be reduced to CO mainly contained in synthetic gases, according to reverse water gas shift reaction, CO can be directly utilized in raw materials for synthesis of hydrocarbons according to the Fischer-Tropsch (FT) reaction ready established, and thus can be easily increased in added value.

Examples of utilization of dual-function materials including FeCrCu/K/MgO—$Al_2O_3$ (Non-patent Document 1) and Cu—K/$Al_2O_3$ (Non-patent Document 2) have been reported as existing procedures for the purposes of $CO_2$ capture and of hydrogen reduction to CO. It is considered with respect to these procedures that alkalis in dual-function materials play a role in the capture action of $CO_2$ and metal species such as FeCrCu and Cu in dual-function materials play a role in the reduction action to CO according to reverse water gas shift reaction. MgO—$Al_2O_3$ and $Al_2O_3$ are supports for retention of alkalis and metal species.

Additionally, a preceding example has also been reported in which a composite oxide such as $Ba_2TiO_4$ is used (Patent Document 1). In this example, high temperature conditions of 800 to 1000° C. are required.

Moreover, a preceding example of a reverse water gas shift catalyst has also been reported in which no $CO_2$ capture is carried out (Patent Document 2). In this example, a catalyst with Fe and Cr as active components or active alumina is described as a reverse water gas shift catalyst.

Further, a preceding example has also been reported in which Ni/$K_2CO_3$/MgO and Ni/$K_2CO_3$/$ZrO_2$ are used for $CO_2$ capture/conversion support particles for carrying out $CO_2$ capture and conversion (Non-patent Document 3). In this example, when reduction with $H_2$ is made after $CO_2$ capture, CO is selectively produced in the case of use of Ni/$K_2CO_3$/MgO for $CO_2$ capture/conversion carrier particles and $CH_4$ and CO are respectively mainly and secondarily produced in the case of use of Ni/$K_2CO_3$/$ZrO_2$ for the support particles.

In addition, an example has also been reported in which a material with $Na_2CO_3$ or $K_2CO_3$ supported on alumina is simply used as an capturing material of $CO_2$ (Non-patent Document 4). In this example, the original form of $CO_2$ is captured and released with temperature conditions being swung between a capture step and a release step of $CO_2$, and it has not been clear that the material can be used as a conversion catalyst for CO.

Furthermore, an example has also been reported in which a material with a Fe—Co alloy supported on nitrogen-doped graphene as a carbonaceous support is utilized as a $CO_2$ conversion catalyst (Non-patent Document 5).

As described above, it has been conventionally considered that metal species Ni, Fe, and Co, and composite oxides mainly play a role in the conversion action of $CO_2$.

Alkali metal-doped molybdenum carbide, supported on gamma alumina (A-$Mo_2$C/γ-$Al_2O_3$, A=K, Na, Li), are also known as catalysts of for $CO_2$ hydrogenation via the reverse water-gas shift (RWGS) reaction to selectively produce CO for down-stream hydrocarbon synthesis. The catalysts are synthesized by co-impregnation of molybdenum and alkali metal precursors onto a γ-$Al_2O_3$support (Patent Document 3).

CITATION LIST

Patent Document

[Patent Document 1] International Publication No. WO 2008/038484
[Patent Document 2] Japanese Patent Application Publication No. 2000-233917
[Patent Document 3] U.S. Patent Application Publication No. 2018/0015444

Non-Patent Document

[Non-patent Document 1] L. F. Bobadilla et al., Journal of $CO_2$ Utilization, 2016, 14, 106-111.
[Non-patent Document 2] T. Hyakutake et al., Journal of Materials Chemistry A, 2016, 4, 6878-6885.
[Non-patent Document 3] Koki Nanase et al., Proceeding of SCEJ 85th Annual Meeting (2020), PA162
[Non-patent Document 4] R. R. Kondakindi et al., International Journal of Greenhouse Gas Control, 2013, 15, 65-69.
[Non-patent Document 5] L. Peng et al., ACS Sustainable Chemistry & Engineering, 2021, 9, 9264-9272.

SUMMARY OF THE DISCLOSURE

Technical Problems

In view of the above circumstances, an object is to provide a method for producing CO by reduction of $CO_2$, which can be realized at a high efficiency without any metal species (Ni, Fe, Co, Cr, Cu, Ru, In, Rh, Pt, Au, and Pd) and composite oxides such as $Ba_2TiO_4$ causing an increase in cost, and an apparatus used therefor.

Solution to Problems

The present inventors have made intensive studies in order to solve the above or other problems.

As a result, in some embodiments, it has been found that CO can be efficiently produced by a method for producing CO, in which an adsorption-conversion catalyst with an additive such as an alkali metal or an alkaline earth metal supported on a support, not substantially comprising Ni, Fe, Co, Cr, Cu, Ru, In, Rh, Pt, Au, and Pd elements, is used and the adsorption-conversion catalyst is contacted with $CO_2$, and some embodiments of the present disclosure have been completed based on such findings.

Advantageous Effects of Disclosure

According to one embodiment, CO can be produced at a high efficiency by use of an alkali metal and an alkaline earth metal commonly used as a capturing material of $CO_2$.

DESCRIPTION OF THE EMBODIMENTS

Figure 1:
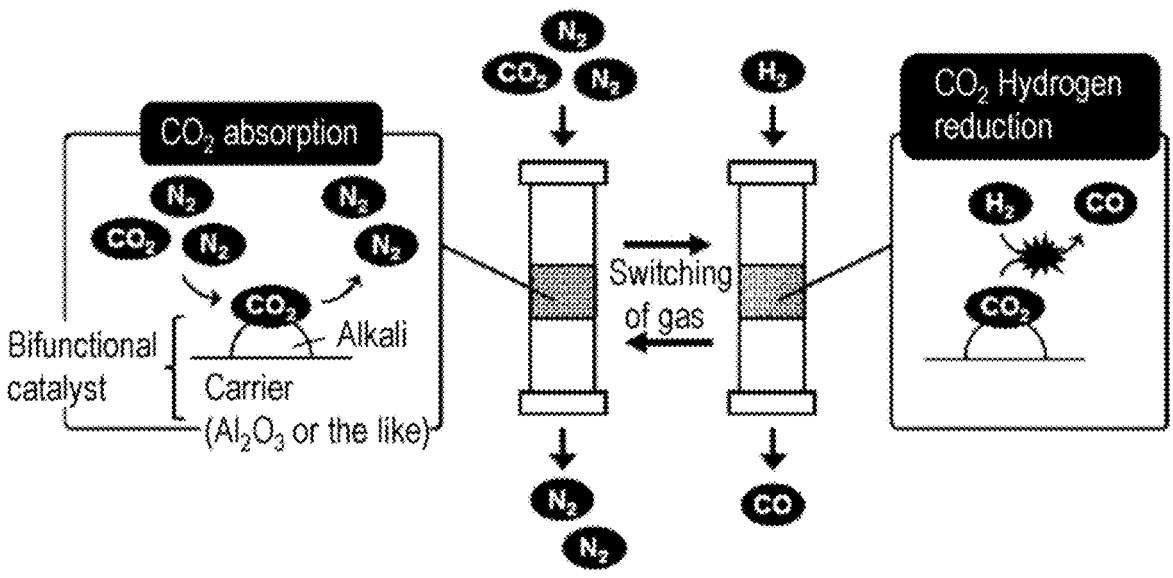
FIG. 1 illustrates one portion of an integrated $CO_2$ capture and conversion system for carrying out reaction in a fixed bed, according to one embodiment of the present disclosure.

Hereinafter, embodiments will be described.

In embodiments, the designations "XX or more and YY or less" and "XX to YY" representing numerical value ranges each mean a numerical value range including the lower limit and the upper limit serving as end points, unless particularly noted. When a numerical value range is described stepwise, the upper limit and the lower limit in the numerical value range can be arbitrarily combined.

<Method for Producing Carbon Monoxide from Carbon Dioxide>

The present embodiment relates to a method for producing carbon monoxide from carbon dioxide, the method comprising the steps of:

(a) preparing an adsorption-conversion catalyst comprising
a support, and
an additive comprising at least one selected from the group consisting of an alkali metal and an alkaline earth metal, supported on the support, and
not substantially comprising
Ni, Fe, Co, Cr, Cu, Ru, In, Rh, Pt, Au, and Pd elements (hereinafter, "Ni and the like");

(b) bringing the adsorption-conversion catalyst into contact with a gas containing carbon dioxide to allow the adsorption-conversion catalyst to capture carbon dioxide; and (c) bringing the adsorption-conversion catalyst to which carbon dioxide is captured into contact with a reducing gas to produce carbon monoxide.

As described above, there has been studied use of metal species such as Ni and the like, and composite oxide such as $Ba_2TiO_4$, in a conversion catalyst of $CO_2$. Metal species of Ni and the like mostly promote conversion to methane $CH_4$ and often promote no conversion to CO. Furthermore, there has not been studied any use of an alkali metal and an alkaline earth metal in a conversion catalyst from $CO_2$ to CO. The present embodiment is based on the following unexpected finding by the present inventors: a material with a component such as an alkali metal or an alkaline earth metal supported on a support, while has been conventionally considered to play a role in only the capture action of $CO_2$, has the conversion action from $CO_2$ to CO. CO can be efficiently produced by a method for producing CO, in which this material is used as an adsorption-conversion catalyst and the adsorption-conversion catalyst is contacted with $CO_2$, and then there is provided a solution for producing CO at a high efficiency without any metal species and composite oxide. That is, the present embodiment can be expected to be applied to purification of $CO_2$ in the air, and the like.

In step (a), an adsorption-conversion catalyst is provided which comprises a support, and an additive comprising at least one selected from the group consisting of an alkali metal and an alkaline earth metal, supported on the support, and which does not substantially comprise elements of Ni and the like.

The adsorption-conversion catalyst here means a catalyst having the ability to capture carbon dioxide under predetermined conditions and having the ability to convert carbon dioxide to carbon monoxide by use of a reducing gas.

The adsorption-conversion catalyst comprises a support, and a component containing at least one selected from the group consisting of an alkali metal and an alkaline earth metal supported on the support, and does not substantially comprise elements of Ni and the like.

The "not substantially comprising elements of Ni and the like" means that a trace of impurities incorporated is acceptable. The trace of impurities may be inevitably incorporated, but not intendedly added. In one example, it is meant that the content of each element in the adsorption-conversion catalyst is 0.1 at % or less, preferably 0.05 at % or less, more preferably 0.01 at % or less. In another example, it is meant that the content of each element during adsorption-conversion, on the atomic weight ratio, is 1/1000 or less, preferably 1/2000 or less, more preferably 1/10000 or less with respect to the alkali metal and the alkaline earth metal.

The elements of Ni and the like are Ni, Fe, Co, Cr, Cu, Ru, In, Rh, Pt, Au, and Pd elements, and these are metal species by rule of thumb, whose examples have been reported as additives having the action of reducing $CO_2$ and then converting it to $CH_4$ or CO. CO conversion can be allowed to efficiently occur without the addition of such metal species, and thus a reduction in cost of the adsorption-conversion catalyst can be achieved.

Elements of Ni and the like are not substantially comprised and at least one selected from the group consisting of an alkali metal and an alkaline earth metal is utilized in the adsorption-conversion catalyst, and thus the amount of $CO_2$ converted to $CH_4$ during the conversion of $CO_2$ to CO can be reduced and CO selectiveness can be enhanced.

The support in the adsorption-conversion catalyst is not particularly limited as long as it is used as a catalyst support, and, for example, an oxide support such as an alumina ($Al_2O_3$) support, a silica ($SiO_2$) support, a titania ($TiO_2$) support, a zirconia ($ZrO_2$) support, a ceria ($CeO_2$) support, a calcia (CaO) support, and a magnesia (MgO) support, and a carbonaceous support such as activated carbon, graphite, graphene, carbon nanotube, and carbon black can be used. An alumina support, a silica support, a titania support, a zirconia support, a ceria support, and the like are preferable, and an alumina support and a zirconia support are more preferable, from the viewpoint that, when an additive is supported, high activity is obtained. Such a support may be used singly or in combination of two or more kinds thereof.

That is, the support is preferably at least one selected from the group consisting of an alumina support and a zirconia support.

The configuration of the above adsorption-conversion catalyst is as follows, in some embodiments of the present disclosure.

The adsorption-conversion catalyst can also be defined as comprising a catalyst support and an additive comprising at least one selected from the group consisting of an alkali metal and an alkaline earth metal, supported on the catalyst support, and as not substantially comprising any element other than elements constituting the catalyst support and the additive. In other words, the adsorption-conversion catalyst may be composed essentially of only (consist essentially of) a catalyst support and an additive comprising at least one selected from the group consisting of an alkali metal and an alkaline earth metal supported on the catalyst support. The adsorption-conversion catalyst may be rephrased as a dual-function material (DFM).

The element utilized in the foregoing adsorption-conversion catalyst is as follows, in the view of the periodic table. The alkali metal and the alkaline earth metal, supported on the catalyst support, are respectively a Group 1 element in the periodic table, except for hydrogen, and a Group 2 element in the periodic table. As shown in examples of the above catalyst support, the element which can be comprised in the catalyst support belongs to Group 2 (Mg, Ca), Group 3 (Ce), Group 4 (Ti, Zr), Group 13 (Al), or Group 14 (C, Si) in the periodic table. The above-described configuration "adsorption-conversion catalyst not substantially comprising elements of Ni and the like" can mean that "adsorption-conversion catalyst does not substantially comprise any element belonging to Group 3 to Group 14 in the periodic table, except for Ce, Ti, Zr, Al, C, and Si". Group 3 to Group 14 elements in the periodic table are as follows.

Group 3 elements (Sc, Y, lanthanoid, actinoid)
Group 4 elements (Ti, Zr, Hf, Rf)

Group 5 elements (V, Nb, Ta, Db)
Group 6 elements (Cr, Mo, W, Sg)
Group 7 elements (Mn, Tc, Re, Bh)
Group 8 elements (Fe, Ru, Os, Hs)
Group 9 elements (Co, Rh, Ir, Mt)
Group 10 elements (Ni, Pd, Pt, Ds)
Group 11 elements (Cu, Ag, Au, Rg)
Group 12 elements (Zn, Cd, Hg, Cn)
Group 13 elements (B, Al, Ga, In, Tl, Nh)
Group 14 elements (C, Si, Ge, Sn, Pb, Fl)

Ce, Ti, Zr, Al, C, and Si are excluded from Groups 3 to 14 elements because of being candidates of the constituent element of the above catalyst support. Mg and Ca as candidates of the constituent element of the catalyst support belong to Group 2, and are not elements belonging to Groups 3 to 14. In the IUPAC classification, Groups 3 to 11 are called transition metals or transition elements.

The shape of the adsorption-conversion catalyst is not particularly limited, and particles having an average particle size (median size, D50) of 0.1 to 500 μm are preferable, particles having an average particle size of 1 to 300 μm are more preferable, and particles having an average particle size of 50 to 200 μm are particularly preferable, from the viewpoint of usability. The specific surface area is also not particularly limited, and is preferably 10 to 2,000 m²/g, more preferably 20 to 1,000 m²/g, particularly preferably 30 to 500 m²/g. The average particle size of adsorption-conversion catalyst particles can be measured by, for example, a dynamic light scattering method, an X-ray small angle scattering method, or a laser diffraction method, and the specific surface area can be measured by, for example, a gas adsorption method or a penetration method.

An additive having the effect of capturing carbon dioxide and converting it to carbon monoxide may comprise at least one selected from the group consisting of an alkali metal and an alkaline earth metal.

In some embodiments, the additive is supported on the support in the adsorption-conversion catalyst. Carbon monoxide is produced from carbon dioxide by selectively capturing carbon dioxide by the adsorption-conversion catalyst and allowing the carbon dioxide captured and a reducing gas to react by the adsorption-conversion catalyst as a catalyst.

A mode where the additive is supported on the support is not particularly limited, and is, for example, a mode where the additive adsorbs to a surface of the support.

It is considered that the additive is uniformly dispersed on the support to result in the change in surface area of the additive and supporting of the additive in an amorphous form on the support, and it is considered that the capture action of $CO_2$ to the adsorption-conversion catalyst and the conversion action to CO are thus strongly exhibited.

Examples of the additive include an alkali metal and an alkaline earth metal. Examples of the alkali metal include Li, Na, K, Rb, and Cs, and Na and K are preferable and Na is particularly preferable. Examples of the alkaline earth metal include Mg, Ca, Sr, and Ba, and Ca is preferable from the viewpoint of durability or the like. Such an additive may be used singly or in combination of two or more kinds thereof. The additive supported on the support is present as at least one selected from the group consisting of an alkali metal salt, an alkali metal oxide, and an alkali metal element, and/or at least one selected from the group consisting of an alkaline earth metal salt, an alkaline earth metal oxide, and an alkaline earth metal atom.

If the amount of the additive supported is too small, the adsorption-conversion catalyst is deteriorated in carbon dioxide capture performance and carbon dioxide cannot be efficiently reduced, and thus production efficiency of carbon monoxide from carbon dioxide is deteriorated, and if the amount is too large, coarsening of the additive, pore clogging of the support, and the like occur, and thus carbon dioxide capture performance and carbon monoxide production efficiency are deteriorated. The amount of the additive supported is preferably 0.1 to 50 parts by mass, more preferably 1 to 35 parts by mass, particularly preferably 5 to 25 parts by mass based on 100 parts by mass of the adsorption-conversion catalyst, from the above viewpoints.

The raw materials of the alkali metal and the alkaline earth metal of the additive, here used, can be various alkali metal salts, alkali metal oxides, alkaline earth metal salts, alkaline earth metal oxides, and the like. Such salts are not particularly limited, and examples thereof include halides such as chloride and fluoride, carbonate, hydrogen carbonate, nitrate, acetate, sulfate, and hydrogen sulfate. In particular, nitrate and carbonate are preferable.

The above-mentioned adsorption-conversion catalyst can be produced based on a known method for producing adsorption-conversion catalysts.

For example, the above-mentioned adsorption-conversion catalyst can be produced by impregnating the support with a liquid containing one or more of the alkali metal salt, alkali metal oxide, alkaline earth metal salt, and alkaline earth metal oxide, and then drying the resultant, to thereby support the alkali metal or the alkaline earth metal as the additive, on the support.

In step (b), the adsorption-conversion catalyst is brought into contact with a gas containing carbon dioxide to allow the adsorption-conversion catalyst to capture carbon dioxide. The method for capturing carbon dioxide to the adsorption-conversion catalyst is not particularly limited, and a known method can be used.

The carbon dioxide here used is not particularly limited, and carbon dioxide directly recovered from air or exhaust gas can also be used. The exhaust gas is not particularly limited in terms of the source of generation thereof and the component contained therein, as long as it contains carbon dioxide, and, for example, an exhaust gas generated by burning of a waste product can be used.

The pressure in an atmosphere in capture of carbon dioxide to the adsorption-conversion catalyst may be atmospheric pressure, or the pressure in the atmosphere may be a pressure higher than atmospheric pressure. The method for allowing the pressure in the atmosphere to be a pressure higher than atmospheric pressure is not particularly limited as long as it is a method for achieving a high pressure, and may be, for example, a method involving pressurizing a gas containing carbon dioxide as a raw material and introducing the pressurized gas into a reactor.

The temperature in an atmosphere where carbon dioxide is captured to the adsorption-conversion catalyst can be appropriately adjusted by, for example, the pressure in the atmosphere, and is preferably room temperature to 600° C. from the viewpoint of inhibiting moisture from being condensed into the catalyst and inhibiting the additive from being oxidized.

The time taken for capturing carbon dioxide to the adsorption-conversion catalyst can be appropriately adjusted by, for example, the pressure, the temperature, and the carbon dioxide concentration in the atmosphere.

The carbon dioxide concentration in a gas serving as a raw material in the production method of the present embodiment is not particularly limited. As described above, conversion to carbon monoxide can be performed also from a gas containing carbon dioxide at a low concentration. That is, conversion to carbon monoxide can be performed also from air being a gas usually containing carbon dioxide at a low concentration of about 300 ppm.

In step (c), the adsorption-conversion catalyst to which carbon dioxide is captured is brought into contact with a reducing gas to produce carbon monoxide. The method for contacting the reducing gas with the adsorption-conversion catalyst is not particularly limited, and a known method can be used.

The reducing gas is not particularly limited as long as it can reduce and convert carbon dioxide to carbon monoxide, examples thereof include a pure hydrogen gas, a hydrogen-containing gas, and a methane gas, and a pure hydrogen gas and a hydrogen-containing gas are preferable. A hydrogen gas obtained by water electrolysis with an energy-saving power generation system can also be utilized as the reducing gas. Other gas contained in the hydrogen-containing gas is not particularly limited as long as it does not inhibit a reduction reaction of carbon dioxide, and an inert gas such as a helium gas or a nitrogen gas is preferable. The hydrogen concentration in the hydrogen-containing gas is preferably 5 vol % or more, more preferably 10 vol % or more from the viewpoint of reduction efficiency.

When the captured carbon dioxide and the reducing gas are allowed to react, the atmosphere may be under atmospheric pressure, or the pressure in the atmosphere may be a pressure higher than atmospheric pressure. The method for allowing the pressure in the atmosphere to be a pressure higher than atmospheric pressure is not particularly limited as long as it is a method for achieving a high pressure, and may be, for example, a method involving pressurizing a gas containing carbon dioxide as a raw material and introducing it into a reactor.

The temperature in an atmosphere where the captured carbon dioxide and the reducing gas are allowed to react can be appropriately adjusted by, for example, the pressure in the atmosphere, and is preferably 400° C. or more, more preferably 430° C. or more from the viewpoint that an enhancement in rate of generation of carbon monoxide and suppression of release of carbon dioxide during reduction are realized and a high carbon monoxide production efficiency is obtained. The temperature is preferably 600° C. or less, more preferably 550° C. or less, further preferably 530° C. or less. The temperature is preferably in the temperature range including 450° C. and 500° C. indicated in Examples.

The time taken for allowing the carbon dioxide captured and the reducing gas to react can be appropriately adjusted by, for example, the pressure, the temperature, and the carbon dioxide concentration in the atmosphere.

Apparatus for Performing Production Method of Embodiment

Another aspect of the embodiment relates to an apparatus for carrying out the production method of the present embodiment, wherein the apparatus is a fixed bed type reactor comprising a carbon dioxide capture and carbon monoxide synthesis reactor (hereinafter, also designated as "capture reaction layer".).

The fixed bed can be used to thereby easily recover the catalyst, and an embodiment according to the above method can be performed at a low cost.

One portion of an apparatus of the present embodiment is illustrated in FIG. 1.

FIG. 1, which illustrates one portion of the fixed bed type reactor, illustrates a capture reaction layer according to one embodiment of the present disclosure. In the capture reaction layer, the adsorption-conversion catalyst and the gas containing carbon dioxide are contacted to capture carbon dioxide to the adsorption-conversion catalyst. Subsequently, the adsorption-conversion catalyst to which carbon dioxide is captured and the reducing gas are contacted, and thus carbon monoxide can be synthesized. In other words, one such capture reaction layer can be used to thereby subsequently capture and convert $CO_2$. Herein, an apparatus configuration can also be adopted in which two or more such capture reaction layers are prepared and feeding of the gas containing carbon dioxide and feeding of the reducing gas are complementarily switched every certain time. In this case, recovery and conversion of $CO_2$ can be continuously carried out with at least two such capture reaction layers being switched.

Another aspect of the embodiment relates to an apparatus for carrying out the production method of the present embodiment, wherein the apparatus is a circulating fluidized bed type reactor comprising a carbon dioxide capture reactor, a carbon monoxide synthesis reactor, and a catalyst circulation path connecting the carbon dioxide capture reactor and the carbon monoxide synthesis reactor.

The circulating fluidized bed can be used to thereby allow recovery of $CO_2$ and catalyst reaction of conversion to continuously progress. Furthermore, the circulating fluidized bed, which is scaled up, can be used to thereby allow for progression of catalyst reaction at a high flow rate.

Figure 2:
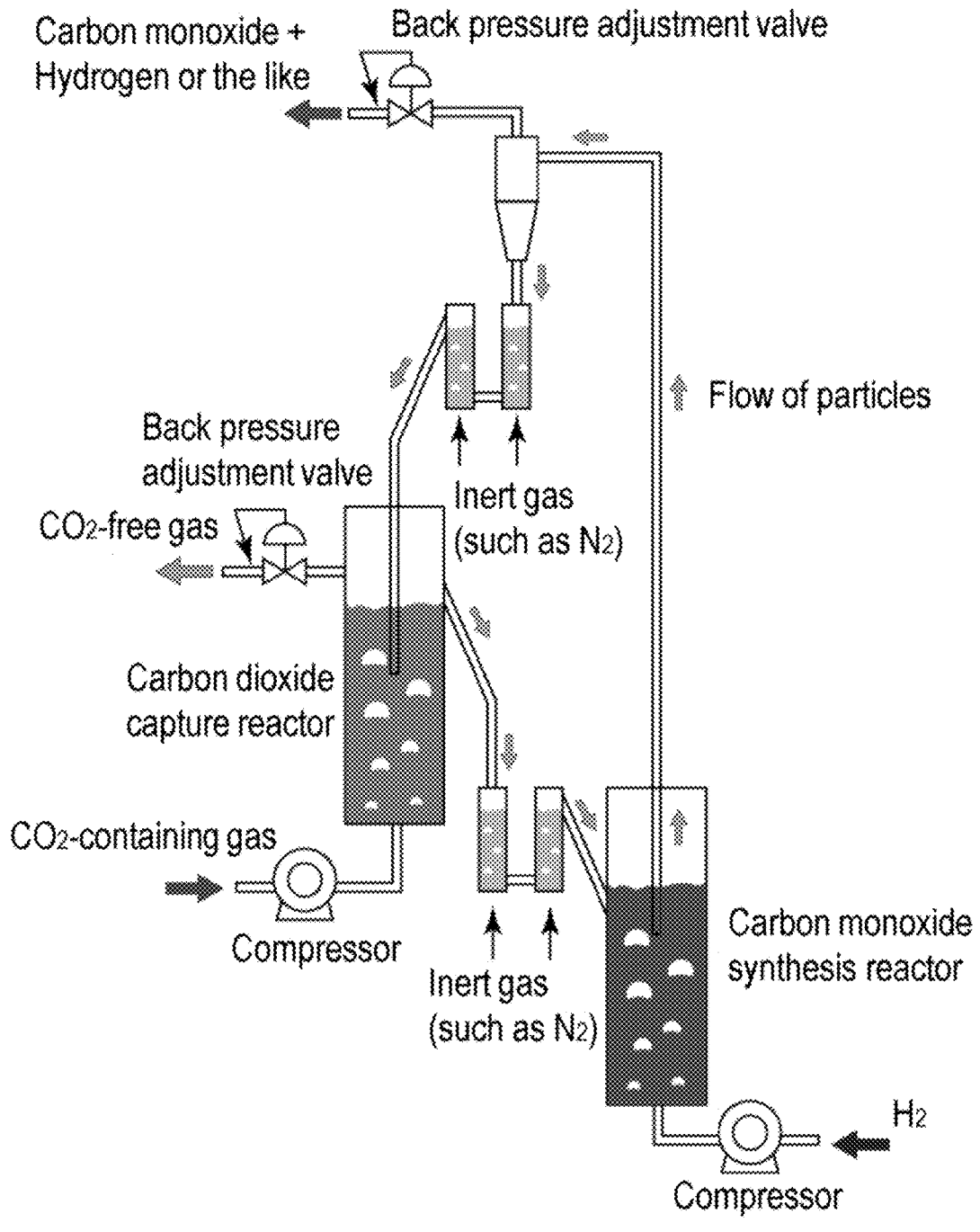
FIG. 2 is a schematic view of an integrated $CO_2$ capture and conversion system for carrying out reaction in a circulating fluidized bed, according to one embodiment of the present disclosure.

An apparatus according to one of the present embodiments is illustrated in FIG. 2.

A circulating fluidized bed type reactor illustrated in FIG. 2 comprises a carbon dioxide capture reactor for contacting the adsorption-conversion catalyst and the gas containing carbon dioxide to thereby capture carbon dioxide to the adsorption-conversion catalyst and recover carbon dioxide, a carbon monoxide synthesis reactor for contacting the adsorption-conversion catalyst to which carbon dioxide is captured and the reducing gas to thereby synthesize carbon monoxide, and a catalyst circulation path which is provided by connection of the carbon dioxide capture reactor and the carbon monoxide synthesis reactor and which is for circulating the catalyst between the two layers. The circulating fluidized bed is here configured from a fluidizing medium, at least one portion of which corresponds to the adsorption-conversion catalyst.

The lower portion of a container in which the carbon dioxide capture reactor is packed is provided with a vent pipe for blowing the gas containing carbon dioxide into the container, and a compressor for pressurizing gas to ventilate the container. The upper portion of the container is provided with an introduction pipe for introducing the catalyst into the container continuing from the catalyst circulation path. The side wall of the container is provided with an exhaust pipe for emitting gas in the container and a back pressure adjustment valve for reducing the pressure of gas and emitting the gas out of the container, and an emission pipe for emitting the catalyst from the container continuing to the catalyst circulation path.

In the carbon dioxide capture reactor, the gas containing carbon dioxide is blown through the vent pipe, and the circulating fluidized bed packed in the container is raised. In this process, the circulating fluidized bed is stirred and mixed, and carbon dioxide is captured to the adsorption-conversion catalyst. Herein, absorption of carbon dioxide is exothermic reaction.

The catalyst emitted from the container in which the carbon dioxide capture reactor is packed is fed to a container in which the carbon monoxide synthesis reactor is packed, through the catalyst circulation path connecting the carbon dioxide capture reactor and the carbon monoxide synthesis reactor. The catalyst circulation path is provided with a gas replacement section for contacting the catalyst with an inert gas.

The lower portion of the container in which the carbon monoxide synthesis reactor is packed is provided with a vent pipe for blowing the reducing gas into the container, and a compressor for pressurizing gas to ventilate the container. The upper portion of the container is provided with an emission pipe for emitting the catalyst from the container continuing to the catalyst circulation path. The side wall of the container is provided with an introduction pipe for introducing the catalyst into the container continuing from the catalyst circulation path.

In the carbon monoxide synthesis reactor, the gas containing the reducing gas is blown through the vent pipe, and the circulating fluidized bed packed in the container is raised. In this process, the circulating fluidized bed is stirred and mixed, carbon dioxide captured to the adsorption-conversion catalyst and the reducing gas react, and carbon monoxide is synthesized from carbon dioxide. Herein, release of carbon dioxide captured once is endothermic reaction, and heating is required. In addition, synthesis of carbon monoxide by carbon dioxide and the reducing gas is also endothermic reaction, and heating is required.

The catalyst emitted from the container in which the carbon monoxide synthesis reactor is packed is fed through the catalyst circulation path to a collection section for collection of the catalyst or the like. In the collection section, a gas generated and the catalyst are separated, the gas generated is emitted through the emission pipe, and the catalyst is returned through the catalyst circulation path to the carbon dioxide capture reactor. The catalyst circulation path is provided with a gas replacement section for contacting the catalyst with an inert gas, and the gas atmospheres of a carbon dioxide gas capture reactor and the synthesis reactor are isolated.

The circulating fluidized bed type reactor in FIG. 2, in which the carbon dioxide capture reactor and the carbon monoxide synthesis reactor are independent from each other, is thus advantageous in a case where the temperature is set so that each reaction is optimized. Absorption reaction of $CO_2$ to alkali is generally advantageously under relatively low temperature conditions, in terms of equilibrium. Meanwhile, synthesis reaction of CO from $CO_2$ is generally advantageously under relatively high temperature conditions. Accordingly, a configuration can be adopted in which the temperature in the carbon dioxide capture reactor is lower than that in the carbon monoxide synthesis reactor.

EXAMPLES

Hereinafter, the present disclosure will be more specifically described with reference to Examples, but it is not limited to these Examples without departing from the gist thereof.

<Preparation of (Na, K, Ca)/$\gamma$-Al$_2$O$_3$ Catalysts>

Gamma-alumina ($\gamma$-Al$_2$O$_3$, MIZUSAWA INDUSTRIAL CHEMICALS, Neobead MSC #300) (particle size range 90 to 425 $\mu$m) was not processed and was used for the support. Na/$\gamma$-Al$_2$O$_3$, K/$\gamma$-Al$_2$O$_3$, and Ca/$\gamma$-Al$_2$O$_3$ catalysts were obtained by impregnating $\gamma$-Al$_2$O$_3$ with an aqueous solution containing an appropriate amount of an alkali metal carbonate or alkaline earth metal nitrate such as sodium carbonate (Na$_2$(CO$_3$), FUJIFILM Wako Pure Chemical), potassium carbonate (K$_2$ (CO$_3$), FUJIFILM Wako Pure Chemical), or calcium nitrate tetrahydrate ($Ca(NO_3)_2$-$4H_2O$, FUJIFILM Wako Pure Chemical), as an alkali precursor for supporting, then drying the resultant at 110° C. overnight, and calcining it at 550° C. in the air for 4 hours. The amount of the alkali metal carbonate or alkaline earth metal nitrate added was 1.5 mmol per gram of such a dual-function material. In other words, the amount per gram of such a dual-function material was 0.16 g in the case of use of sodium carbonate as the alkali precursor, the amount was 0.21 g in the case of use of potassium carbonate, and the amount was 0.29 g in the case of use of calcium nitrate tetrahydrate.

<Preparation of $Na/(ZrO_2, CeO_2, TiO_2)$ Catalysts>

Zirconia ($ZrO_2$, provided by the Catalysis Society of Japan, sample code: JRC-ZrO-9), ceria ($CeO_2$, provided by the Catalysis Society of Japan, sample code: JRC-CeO-5), and titania ($TiO_2$, provided by the Catalysis Society of Japan, sample code: JRC-TiO-16) were not processed and were used for the supports. Sodium carbonate ($Na_2$ ($CO_3$), FUJIFILM Wako Pure Chemical) was used for the alkali raw material for supporting. Impregnation, drying, and calcining were performed by the same procedure as in the above-mentioned $Na/\gamma$-$Al_2O_3$ catalyst. The amount of sodium carbonate added was 1.5 mmol per gram of such a dual-function material, as in the above-mentioned $Na/\gamma$-$Al_2O_3$ catalyst. The respective samples after calcining were press molded into disk shapes and then pulverized, and those having a particle size ranging from 250 to 500 μm were classified to thereby obtain $Na/ZrO_2$, $Na/CeO_2$, and $Na/TiO_2$ catalysts.

<Integrated $CO_2$ Capture and CO Conversion>

An experiment was performed with a fixed bed type reactor, according to the following procedure.

1 g of each of the catalysts prepared was placed in a SUS pipe in an electric furnace. Prior to measurement, such each catalyst was pre-treated under an $H_2$ atmosphere at 500° C. for 1 hour. In order to determine integrated $CO_2$ capture and CO conversion, 5% $CO_2$, $N_2$, $H_2$, and $N_2$ were sequentially fed into a reactor in series respectively for 3 minutes, 3 minutes, 30 minutes, and 3 minutes. Herein, $N_2$ fed next to 5% $CO_2$ and before $H_2$ was fed as a purge gas. Here, the flow rate of each gas fed was 100 mL/min with respect to only $H_2$, and the flow rate of each of other gases was 500 mL/min and was constant.

The reaction temperature as an operation factor was varied from 350 to 500° C. The concentrations of $CO_2$, CO, and $CH_4$ in an outlet gas were measured with a non-dispersive infrared (NDIR) gas analyzer (VA-5000, HORIBA). A thermocouple was inserted into each of the catalysts and thus the reaction temperature was monitored. The reaction temperature was set so as to be the same temperature in a series of sequences of $CO_2$ capture and CO conversion for simplification of the experiment.

Experiments for Comparative Examples were performed where the same operations as described above were performed except that $\gamma$-$Al_2O_3$ on which neither any alkali metal nor any alkaline earth metal was supported was used.

In all the experiments, a series of gas-feeding operations was repeatedly performed for 5 cycles or more in order to confirm reproducibility, and the following experiment data was described as the average value (of the second to fifth cycles except for the initial first cycle)±standard deviation.

Figure 3:
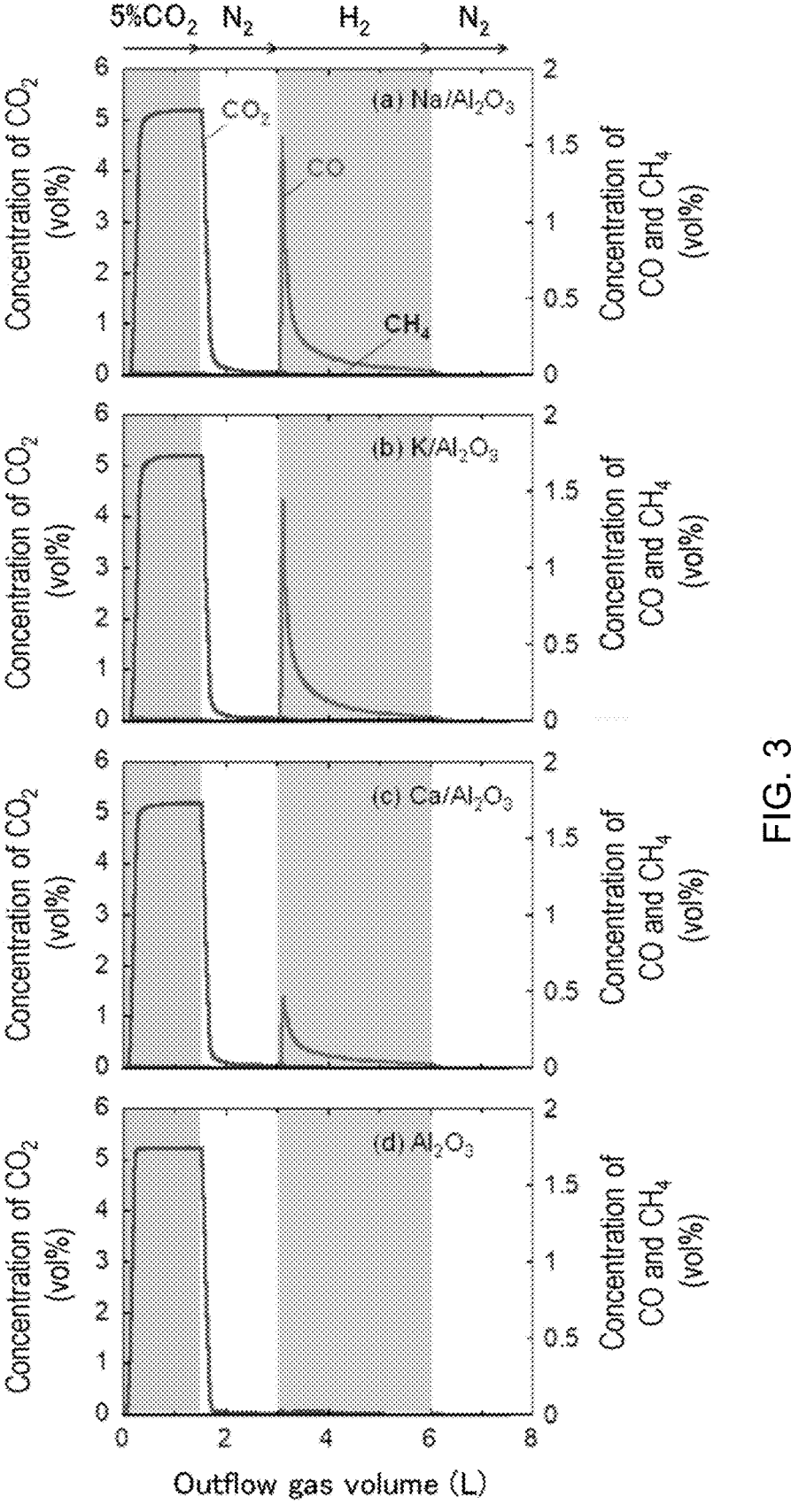
FIG. 3 illustrates composition profiles of outflow gases from a reactor under conditions of an atmospheric pressure and 450° C., and illustrates the concentrations of $CO_2$, CO, and $CH_4$. (a) illustrates the results with $Na/\gamma$-$Al_2O_3$, (b) illustrates the results with $K/\gamma$-$Al_2O_3$, (c) illustrates the results with $Ca/\gamma$-$Al_2O_3$, and (d) illustrates the results with $\gamma$-$Al_2O_3$ according to some embodiments of the present disclosure.

FIG. 3 illustrates measurement results of $CO_2$ capture and conversion with various catalysts $Na/\gamma$-$Al_2O_3$ (a), $K/\gamma$-$Al_2O_3$ (b), $Ca/\gamma$-$Al_2O_3$ (c), and $\gamma$-$Al_2O_3$ (d) at 450° C. under an atmospheric pressure (1 atm). Each horizontal axis in the drawings represents the outflow gas volume (L), and the volume, if converted by the flow rate of gas fed (mL/min), serves as the lapse time.

In the case of supporting of an additive as in (a) to (c) of FIG. 3, the concentration of $CO_2$ was mildly increased behind the start of feeding of $CO_2$ and was gradually close to the concentration of feeding. Accordingly, $CO_2$ is considered to be captured.

On the other hand, in the case of supporting of no additive and use of only $\gamma$-$Al_2O_3$ as a support as in (d) of FIG. 3, the concentration of $CO_2$ was rapidly close to the concentration of feeding in $CO_2$ feeding. Almost no generation of CO was observed in hydrogen feeding.

Figure 4:
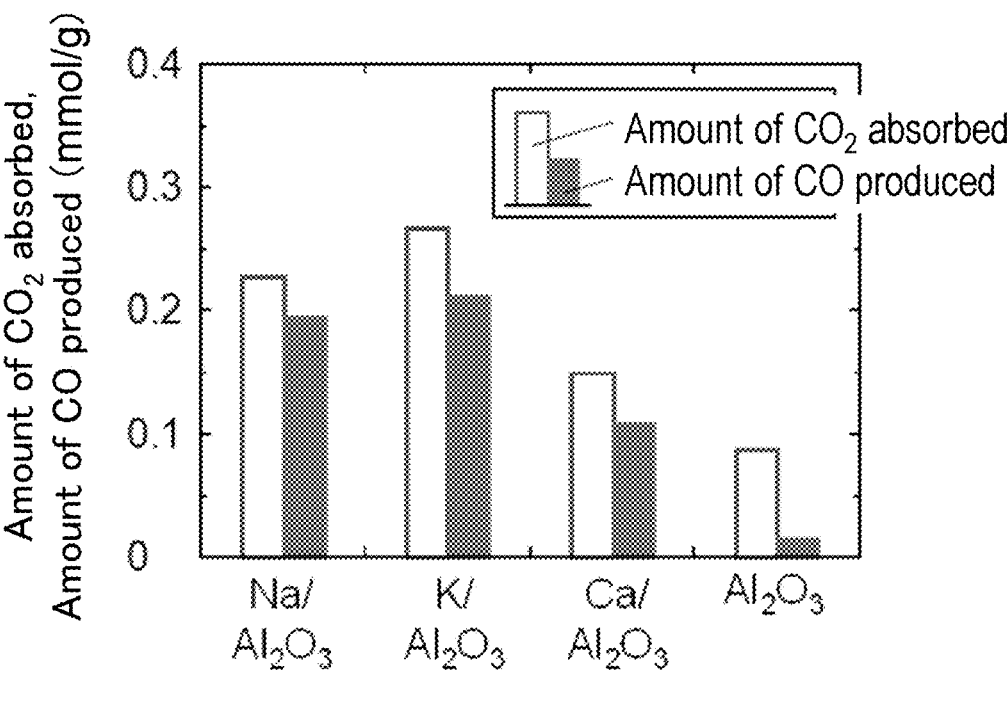
FIG. 4 is a diagram illustrating the amounts of $CO_2$ absorbed and the amounts of CO produced in dual-function materials with various additives supported according to some embodiments of the present disclosure.

FIG. 4 illustrates the results of the amount of $CO_2$ absorbed and the amount of CO produced, calculated by integration of measurement results in FIG. 3. The amount of $CO_2$ absorbed and the amount of CO produced were increased in the case of supporting of any additive, as compared with the case of only $\gamma$-$Al_2O_3$ as a support. The maximum amount of $CO_2$ absorbed and amount of CO produced were obtained in the case of use of $K/\gamma$-$Al_2O_3$.

The $CO_2$ conversion rate (amount of CO produced/amount of $CO_2$ absorbed) based on the amount of absorption, as an index for evaluation of conversion efficiency of $CO_2$ captured, to CO, the selectivity of $CO/(CO+CH_4)$, and the yield of CO as a product of multiplication thereof were calculated, and collectively shown in Table 1.

TABLE 1

| Bifunctional catalyst | Conversion rate of $CO_2$ based on amount of absorption (%) | Selectivity of $CO/(CO + CH_4)$ (%) | Yield of CO (%) |
|---|---|---|---|
| $Na/Al_2O_3$ | 86.3 ± 0.7 | 99.2 ± 0.1 | 85.6 ± 0.7 |
| $K/Al_2O_3$ | 82.9 ± 0.4 | 95.4 ± 0.3 | 79.1 ± 0.2 |
| $Ca/Al_2O_3$ | 73.4 ± 2.4 | 98.7 ± 0.1 | 72.4 ± 2.4 |
| $Al_2O_3$ | 20.3 ± 0.2 | 89.6 ± 0.3 | 18.1 ± 0.2 |

The $CO_2$ conversion rates in $Na/\gamma$-$Al_2O_3$ and $K/\gamma$-$Al_2O_3$ were particularly high, and the selectivities of CO in $Na/\gamma$-$Al_2O_3$ and $Ca/\gamma$-$Al_2O_3$ were particularly high. The yield of CO was higher in the order corresponding to $Na/\gamma$-$Al_2O_3$, $K/\gamma$-$Al_2O_3$, and $Ca/\gamma$-$Al_2O_3$. With reference to FIG. 4 and Table 1, even a simple $Al_2O_3$ substance of Comparative Example absorbed $CO_2$ and produced CO at certain levels, and the catalyst action of $CO_2$ absorption and conversion, while was observed, was not large in value. On the contrary, when Na, K, or Ca (hereinafter, Na or the like) was supported, a $CO_2$ conversion rate of 3.6 times to 4 times or more that of the simple $Al_2O_3$ substance was exhibited, and a remarkable catalyst action of CO conversion was generated.

Figure 5:
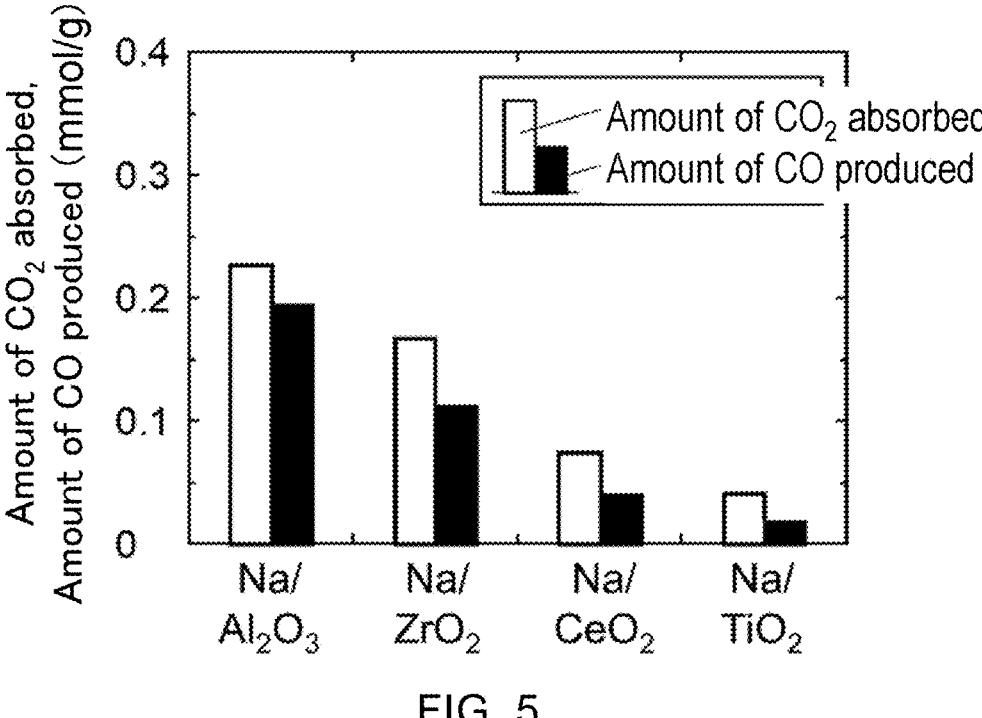
FIG. 5 is a diagram illustrating the amounts of $CO_2$ absorbed and the amounts of CO produced in various dual-function materials different in support according to some embodiments of the present disclosure.

FIG. 5 illustrates the amounts of $CO_2$ absorbed and the amounts of CO produced, calculated based on measurement results of $CO_2$ capture and conversion at 450° C. under an atmospheric pressure (1 atm), with various catalysts $Na/\gamma$-$Al_2O_3$, $Na/ZrO_2$, $Na/CeO_2$, and $Na/TiO_2$ different in support. All the values were higher in the order corresponding to $Na/\gamma$-$Al_2O_3$, $Na/ZrO_2$, $Na/CeO_2$, and $Na/TiO_2$.

The $CO_2$ conversion rate, the selectivity of CO, and the yield of CO, with respect to each of the catalysts, were calculated, and collectively shown in Table 2. The $Na/\gamma$-$Al_2O_3$ catalyst simultaneously satisfied particularly high $CO_2$ conversion rate and selectivity of CO, resulting in the maximum yield of CO.

TABLE 2

| Bifunctional catalyst | Conversion rate of $CO_2$ based on amount of absorption (%) | Selectivity of $CO/(CO + CH_4)$ (%) | Yield of CO (%) |
|---|---|---|---|
| Na/Al$_2$O$_3$ | 86.3 ± 0.7 | 99.2 ± 0.1 | 85.6 ± 0.7 |
| Na/ZrO$_2$ | 87.7 ± 0.4 | 76.3 ± 0.8 | 67.0 ± 1.0 |
| Na/CeO$_2$ | 63.0 ± 0.3 | 84.6 ± 0.3 | 53.6 ± 0.3 |
| Na/TiO$_2$ | 50.0 ± 0.9 | 83.6 ± 0.2 | 41.8 ± 0.7 |

Figure 6:
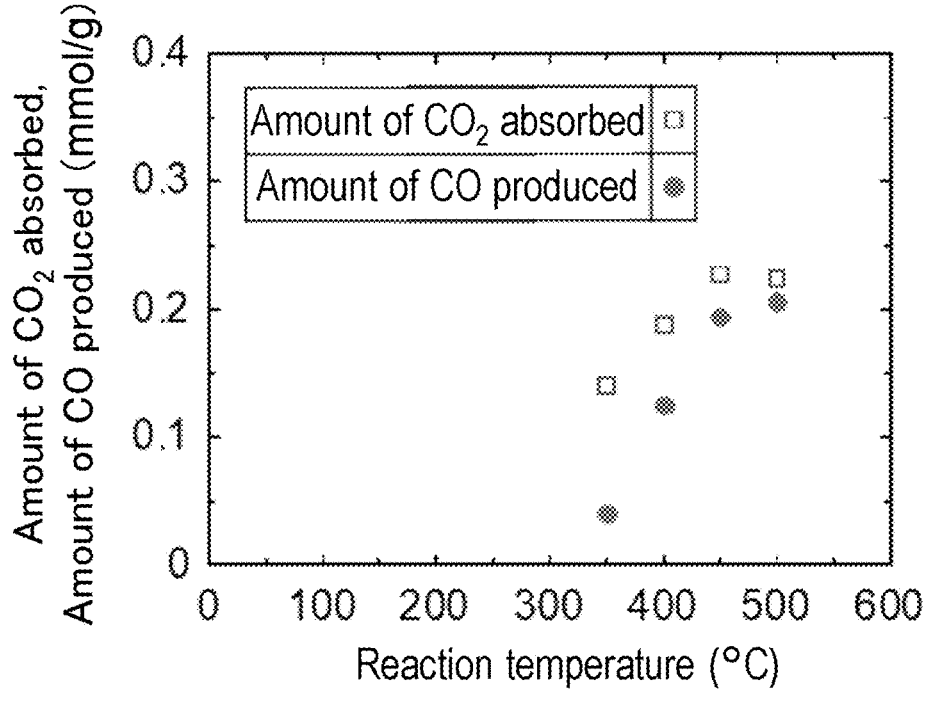
FIG. 6 is a diagram for comparison between the amounts of $CO_2$ absorbed and the amounts of CO produced at various reaction temperatures by use of $Na/\gamma$-$Al_2O_3$ according to some embodiments of the present disclosure.

FIG. 6 illustrates the amount of $CO_2$ absorbed and amount of CO produced, with respect to the reaction temperature on Na/$\gamma$-Al$_2$O$_3$. Production of CO was observed even under a condition of a low temperature of 350° C. Both the amount of $CO_2$ absorbed and the amount of CO produced showed a tendency to be increased according to an increase in reaction temperature and be constant at 450° C. or more.

The $CO_2$ conversion rates, the selectivities of CO, and the yields of CO at various reaction temperatures were calculated and collectively shown in Table 3.

TABLE 3

| Temperature (° C.) | Conversion rate of $CO_2$ based on amount of absorption (%) | Selectivity of $CO/(CO + CH_4)$ (%) | Yield of CO (%) |
|---|---|---|---|
| 500 | 94.9 ± 1.0 | 97.4 ± 0.1 | 92.4 ± 1.0 |
| 450 | 86.3 ± 1.3 | 99.2 ± 0.1 | 85.6 ± 1.3 |
| 400 | 67.1 ± 0.7 | 99.1 ± 0.1 | 66.6 ± 0.7 |
| 350 | 28.8 ± 0.9 | 99.6 ± 0.3 | 28.7 ± 1.0 |

The $CO_2$ conversion rate was higher under higher temperature conditions, and the selectivity of CO exhibited was a very high value of 97% or more between 35° and 500° C. The yield of CO as a product thereof was higher under higher temperature conditions, as in the conversion rate, and was mildly increased at 450° C. or more. Table 1 in paragraph 0041 of Patent Document 1 shows an experiment example (Example 4) of a selectivity of CO of 85% in CO generation performed at 900° C. with Ba$_2$TiO$_4$ as a carbon dioxide absorption material and hydrogen as a reducing gas. When compared therewith, the results at 450° C. in Table 3 show a selectivity of CO of 99.2% and a yield of CO of 85.6%, and conversion into CO at a very high efficiency can be achieved even at a low temperature that is about half of 900° C. While FIG. 3(B) of Non-patent Document 1 shows an experiment result of a $CO_2$ conversion rate of about 80 to 90% by the FeCrCu/K/MgO—Al$_2$O$_3$ catalyst, shown between 45° and 550° C. under ideal conditions, the results in Table 3 described above achieve a $CO_2$ conversion rate equivalent to or more than that without the addition of any metal species for conversion into CO.

Figure 7:
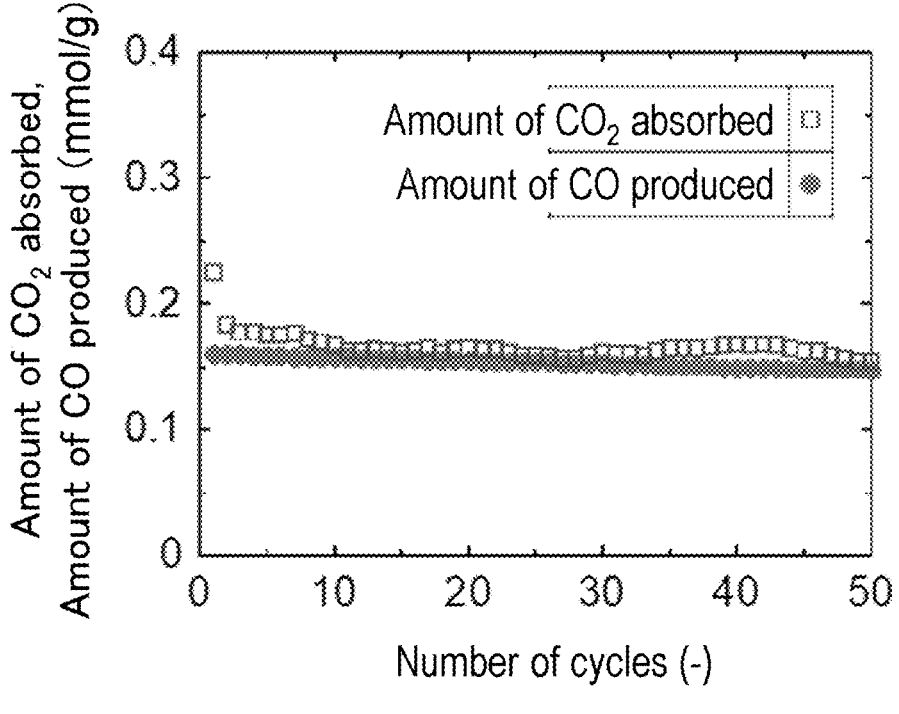
FIG. 7 is a diagram illustrating the transitions of the amount of $CO_2$ absorbed and the amount of CO produced in the case of an absorption/conversion experiment of $CO_2$ carried out at 450° C. for 50 cycles by use of $Na/\gamma$-$Al_2O_3$ according to some embodiments of the present disclosure.

FIG. 7 illustrates the transitions of the amount of $CO_2$ absorbed and the amount of CO produced in the case of an absorption/conversion experiment of $CO_2$ carried out at 450° C. for 50 cycles by use of Na/$\gamma$-Al$_2$O$_3$.

The amount of $CO_2$ absorbed showed a tendency to be particularly large at the first cycle immediately after hydrogen reduction as pre-treatment and be reduced at the second cycle, but be subsequently constant at a value of about 0.2 mmol per gram of the dual-function material. The amount of CO produced was constant at a value slightly smaller than the amount of $CO_2$ absorbed. Accordingly, it has been found that the dual-function material used in the present embodiment is not significantly reduced in activity even by repeated use for absorption of $CO_2$ and conversion thereof to CO and is high in durability.

<Production of Synthetic Gas from Atmospheric Concentration of $CO_2$>

It is extremely important in production of a synthetic gas as a mixed gas of CO and $H_2$ to control not only the concentration of CO produced, but also the molar ratio ($H_2$/CO ratio) with unreacted $H_2$. For example, the $H_2$/CO ratio in the synthetic gas is desirably about 2 to 3 in a Fischer-Tropsch (FT) reaction for production of a liquid fuel.

In order to demonstrate that a synthetic gas having a practical composition could be produced from an atmospheric concentration of $CO_2$ by the present technique, the above experiment for integrated $CO_2$ capture and conversion to CO was scaled up to 60 times.

The adsorption-conversion catalyst here used was 60 g of Na/$\gamma$-Al$_2$O$_3$ having high activity. The experiment was performed by the above-mentioned procedure. Herein, experimental conditions were changed as follows. The gases sequentially fed into a reactor were 400 ppm $CO_2$, N$_2$, and $H_2$, and the respective feeding times were 12 hours, 15 minutes, and 150 minutes. The flow rate of each gas fed was 200 mL/min with respect to only $H_2$, and the flow rate of each of other gases was 1000 mL/min and was constant. The reaction temperature was 500° C. An outlet gas was analyzed with, in addition to the above-mentioned gas analyzer, a micro gas chromatograph (Agilent 490, Agilent Technologies). Herein, the outlet gas was collected in a gas bag for a predetermined period, and was adopted as a sample for analysis.

Figure 8:
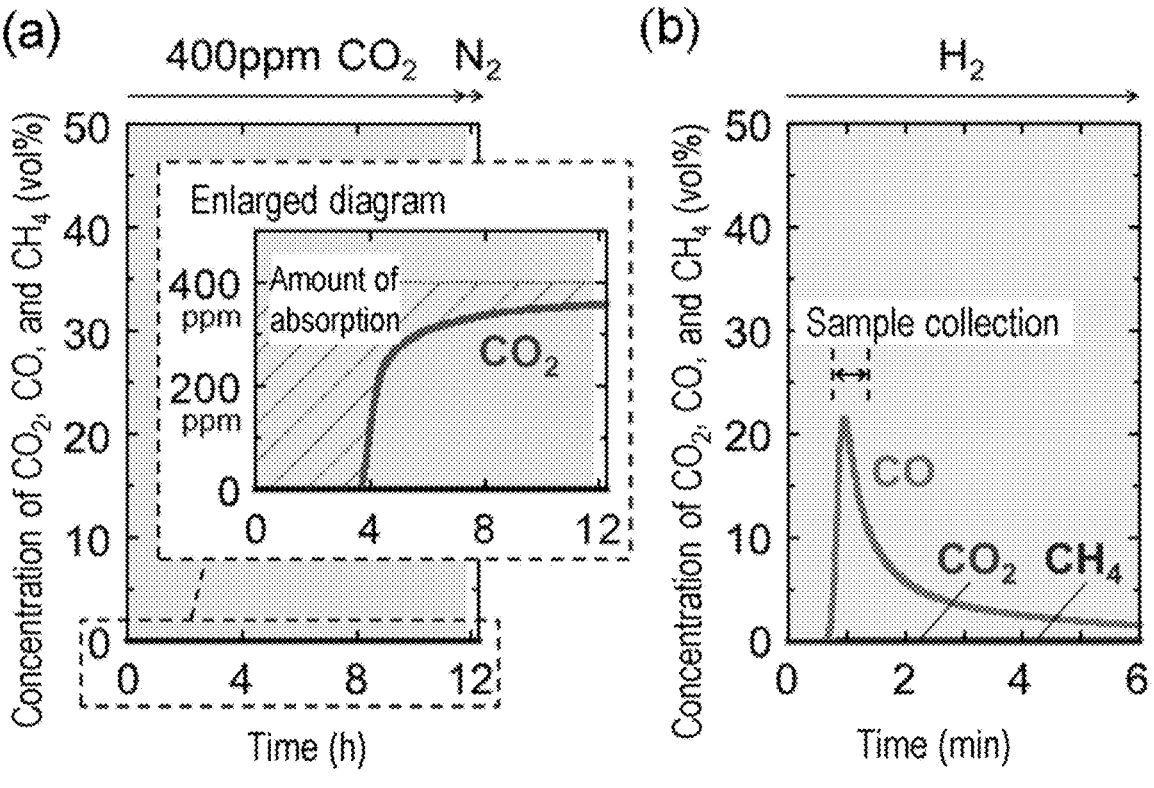
FIG. 8 illustrates outflow gas composition profiles in the case of synthetic gas production from an atmospheric concentration of $CO_2$ on the scale up to 60 times at 500° C. by use of $Na/\gamma$-$Al_2O_3$, and illustrates the concentrations of $CO_2$, CO, and $CH_4$ according to some embodiments of the present disclosure.

FIG. 8 illustrates the measurement results of the outlet gas concentration in $CO_2$ capture and conversion scaled up. (a) of FIG. 8 illustrates the measurement results of the outlet gas concentration in a $CO_2$ capture process involving sequentially feeding 400 ppm $CO_2$ and N$_2$. In the process, even an atmospheric concentration (400 ppm) of $CO_2$ was efficiently absorbed by the adsorption-conversion catalyst and almost no $CO_2$ was flown out for about 4 hours from the start of the experiment. (b) of FIG. 8 illustrates the measurement results of the outlet gas concentration in a conversion process involving feeding $H_2$. In the process, when feeding of $H_2$ was started, CO was rapidly released. On the other hand, the concentrations of $CO_2$ and CH$_4$ were at most about 1 vol % or less, and high selectiveness in CO conversion was observed. It was meant that reverse water gas shift reaction progressed between $CO_2$ absorbed by the adsorption-conversion catalyst and $H_2$. The peak concentration of CO was more than 20%, and reached 500 times or more the concentration of $CO_2$ fed.

An outlet gas around the CO peak was collected as a sample, and subjected to compositional analysis with a micro gas chromatograph, and as a result, the respective concentrations of CO and $H_2$ were 14.5% and 48.1%. Accordingly, an $H_2$/CO ratio of 3.3, which was a value close to the concentration of a practical synthetic gas, could be achieved. The result indicates that a synthetic gas having a desirable $H_2$/CO ratio can be produced by appropriate controlling the amount of CO produced and the amount of unreacted $H_2$.

As described above, it has been indicated that efficient production can be made by the production method of Examples, which is a method for producing CO in which an adsorption-conversion catalyst with a component such as an alkali metal or an alkaline earth metal supported on a support is used and $CO_2$ is contacted with the adsorption-conversion catalyst. Such reaction efficiently occurs at a relatively low temperature of about 450° C., and thus also contributes to a reduction in cost for production.

The embodiments understood from the above disclosure are exemplified as follows.

[1] A method for producing carbon monoxide, the method comprising the steps of:

(a) preparing an adsorption-conversion catalyst comprising a support, and an additive comprising at least one selected from the group consisting of an alkali metal and an alkaline earth metal, supported on the support, and not substantially comprising Ni, Fe, Co, Cr, Cu, Ru, In, Rh, Pt, Au, and Pd elements, (b) bringing the adsorption-conversion catalyst into contact with a gas containing carbon dioxide to allow the adsorption-conversion catalyst to capture carbon dioxide, and (c) bringing the adsorption-conversion catalyst to which carbon dioxide is captured into contact with a reducing gas to produce carbon monoxide.

[2] The method according to [1], wherein the support is at least one selected from the group consisting of an alumina support and a zirconia support.

[3] The method according to [1] or [2], wherein the additive in step (a) comprises at least one selected from the group consisting of Na, K, and Ca.

[4] The method according to [3], wherein the additive in step (a) comprises Na.

[5] The method according to any of [1] to [4], wherein step (c) is carried out at 400 to 600° C.

[6] The method according to any of [1] to [5], wherein the reducing gas in step (c) is a hydrogen-containing gas.

[7] The method according to any of [1] to [6], wherein the carbon dioxide in step (b) is carbon dioxide directly captured from air or exhaust gas.

[8] An apparatus for carrying out the method according to any of [1] to [7], wherein the apparatus is a circulating fluidized bed type reactor comprising a carbon dioxide capture reactor, a carbon monoxide synthesis reactor, and a catalyst circulation path connecting the carbon dioxide capture reactor and the carbon monoxide synthesis reactor.

[9] An apparatus for carrying out the method according to any of [1] to [8], wherein the apparatus is a fixed bed type reactor comprising a carbon dioxide capture and carbon monoxide synthesis reactor.

INDUSTRIAL APPLICABILITY

Not only application to carbon recycle of $CO_2$ emitted from an electric power plant, a factory, and the like, but also application to purification of $CO_2$ in the air, and the like can be expected.

What is claimed is:

1. A production method for producing carbon monoxide; the production method comprising the steps of:

(a) preparing an adsorption-conversion catalyst, which is one or more selected from the group consisting of $Na/Al_2O_3$, $K/Al_2O_3$, and $Na/ZrO_2$, wherein $Al_2O_3$ and $ZrO_2$ are supports, and Na and K are additives, and which not substantially comprising

16

Ni, Fe, Co, Cr, Cu, Ru, In, Rh, Pt, Au, and Pd elements;

(b) bringing the adsorption-conversion catalyst into contact with a gas containing carbon dioxide to allow the adsorption-conversion catalyst to capture the carbon dioxide; and (c) bringing the adsorption-conversion catalyst to which the carbon dioxide is captured into contact with a reducing gas to produce carbon monoxide.

2. The production method according to claim 1, wherein the adsorption-conversion catalyst is one or more selected from the group consisting of $Na/Al_2O_3$ and $K/Al_2O_3$.

3. The production method according to claim 1, wherein step (c) is carried out at a temperature within a range of 400° C. to 600° C.

4. The production method according to claim 1, wherein the reducing gas in step (c) is a hydrogen-containing gas.

5. The production method according to claim 1, wherein the carbon dioxide in step (b) is carbon dioxide directly captured from air or exhaust gas.

6. The production method according to claim 1, wherein step (c) begins after termination of step (b) by stopping supply of the gas containing carbon dioxide.

7. The production method according to claim 1, wherein:

the production method is performed in a circulating fluidized bed reactor including a carbon dioxide capture reactor, a carbon monoxide synthesis reactor, and a particle circulation path connecting the carbon dioxide capture reactor and the carbon monoxide synthesis reactor, step (b) is performed in the carbon dioxide capture reactor to which the gas containing the carbon dioxide is supplied, the adsorption-conversion catalyst to which the carbon dioxide is captured by step (b) is flowed to the carbon monoxide synthesis reactor from the carbon dioxide capture reactor via the particle circulation path, and step (c) is performed in the carbon monoxide synthesis reactor to which the reducing gas is supplied.

8. The production method according to claim 1, wherein:

the production method is performed in a fixed bed reactor in which the adsorption-conversion catalyst is held, step (b) is performed in the fixed bed reactor to which the gas containing carbon dioxide is supplied during a first determined period, and step (c) is performed in the fixed bed reactor to which the reducing gas is supplied during a second determined period.

9. A production method for producing carbon monoxide, the production method comprising the steps of:

(a) preparing an adsorption-conversion catalyst consisting essentially of one or more selected from the group consisting of $Na/Al_2O_3$, $K/Al_2O_3$, and $Na/ZrO_2$, wherein $Al_2O_3$ and $ZrO_2$ are supports, and Na and K are additives;

(b) bringing the adsorption-conversion catalyst into contact with a gas containing carbon dioxide to allow the adsorption-conversion catalyst to capture the carbon dioxide; and (c) bringing the adsorption-conversion catalyst to which the carbon dioxide is captured into contact with a reducing gas to produce carbon monoxide.

10. The production method according to claim 9, wherein the adsorption-conversion catalyst consists essentially of one or more selected from the group consisting of $Na/Al_2O_3$ and $K/Al_2O_3$.

11. The production method according to claim 9, wherein step (c) is carried out at a temperature within the range of 400° C. to 600° C.

12. The production method according to claim 9, wherein step (c) begins after termination of step (b) by stopping supply of the gas containing carbon dioxide.

13. The production method according to claim 9, wherein:

the production method is performed in a circulating fluidized bed reactor including a first reactor, a second reactor, and a path connecting the first reactor and the second reactor, step (b) is performed in the first reactor to which the gas containing the carbon dioxide is supplied, the adsorption-conversion catalyst to which the carbon dioxide is captured by step (b) is flowed to the second reactor from the first reactor via the path, and step (c) is performed in the second reactor to which the reducing gas is supplied.

14. The production method according to claim 9, wherein:

the production method is performed in a fixed bed reactor including a reactor in which the adsorption-conversion catalyst is held, step (b) is performed in the reactor to which the gas containing the carbon dioxide is supplied during a first determined period, and step (c) is performed in the reactor to which the reducing gas is supplied during a second determined period.

\*　\*　\*　\*　\*